(12) United States Patent
Yamamoto et al.

(10) Patent No.: US 8,159,187 B2
(45) Date of Patent: Apr. 17, 2012

(54) CHARGING CIRCUIT FOR SECONDARY BATTERY

(75) Inventors: Takeshi Yamamoto, Tokyo (JP); Yoshiharu Shimizu, Aichi (JP)

(73) Assignees: Tamura Corporation, Tokyo (JP); Makita Corporation, Aichi (JP)

( * ) Notice: Subject to any disclaimer, the term of this patent is extended or adjusted under 35 U.S.C. 154(b) by 371 days.

(21) Appl. No.: 12/273,244

(22) Filed: Nov. 18, 2008

(65) Prior Publication Data

US 2009/0134840 A1 May 28, 2009

(30) Foreign Application Priority Data

Nov. 27, 2007 (JP) ................................. 2007-306523

(51) Int. Cl.
*H02J 7/00* (2006.01)
(52) U.S. Cl. ........................................ 320/134; 320/149
(58) Field of Classification Search .................. 320/134, 320/136, 149
See application file for complete search history.

(56) References Cited

U.S. PATENT DOCUMENTS

| 6,208,117 | B1 | 3/2001 | Hibi | |
| 6,268,710 | B1 | 7/2001 | Koga | |
| 2002/0175655 | A1* | 11/2002 | Huykman et al. | 320/116 |
| 2006/0071643 | A1 | 4/2006 | Carrier et al. | |
| 2006/0103350 | A1* | 5/2006 | Lai | 320/118 |
| 2006/0139008 | A1* | 6/2006 | Park | 320/134 |

FOREIGN PATENT DOCUMENTS

| JP | 8294238 | 11/1996 |
| JP | 9140067 | 5/1997 |
| JP | 11194143 | 7/1999 |
| JP | 2007-014091 | 1/2007 |

\* cited by examiner

*Primary Examiner* — Melissa Koval
*Assistant Examiner* — Robert Grant (57) ABSTRACT

An operational amplifier connects to a midpoint between a plurality of serially connected battery cells constituting a secondary battery to provide a charging circuit for inhibiting a charge/discharge current from flow in to the midpoint and an input/output current from flowing from the midpoint to each battery cell. The charging circuit includes excess voltage detectors for detecting whether the voltage is an excess voltage, and a charging controller for determining an overcharge state of each battery cell on the basis of the voltages detected and controlling an ON/OFF of a charging switch. Voltage followers include an operational amplifier, NPN transistor, and the like, connected to a midpoint between a first battery cell and a second battery cell and a midpoint between the second battery cell and the third battery, respectively. The outputs of the voltage followers are configured as the grounds of the excess voltage detectors, respectively.

5 Claims, 4 Drawing Sheets

FIG. 4 PRIOR ART an overcharge state due to excess voltage or excess current added from the charger to the secondary battery. For example, when a lithium ion battery enters the overcharge state, an irregular amount of voltage or current is added thereto, and as a result the battery produces heat, causing deformation thereof and, in some cases, bursting or firing.

CHARGING CIRCUIT FOR SECONDARY BATTERY

BACKGROUND OF THE INVENTION

1. Field of the Invention

The present invention relates to a circuit for charging a secondary battery constituted by a plurality of serially connected battery cells. More particularly, the present invention relates to a charging circuit for a secondary battery, which is capable of preventing current from leaking out of each battery cell and of accurately detecting voltage of each battery cell.

2. Description of the Related Art

Cellular phones, digital cameras, and other portable electronic devices these days are installed with chargeable secondary batteries as the power sources. Lithium ion batteries are mostly used as these secondary batteries, and especially a charging circuit in which a plurality of fuel cells composed of the lithium ion batteries are connected serially or in parallel is widely used. For such secondary batteries, the demand for increase in the charging capacities and densities has been growing.

In order to supply power to the charging circuit for charging such secondary battery, a charger is connected to the charging circuit. However, the secondary battery might enter an overcharge state due to excess voltage or excess current added from the charger to the secondary battery. For example, when a lithium ion battery enters the overcharge state, an irregular amount of voltage or current is added thereto, and as a result the battery produces heat, causing deformation thereof and, in some cases, bursting or firing.

Therefore, in order to solve the above problems, an overcharge protection circuit has been developed. When charging a plurality of serially connected lithium ion battery cells, this overcharge protection circuit monitors the total voltage of the plurality of lithium ion battery cells, and, when the total voltage exceeds a predetermined voltage, determines that the lithium ion battery cells are in the overcharge state and therefore stops charging the lithium ion battery cells.

However, in this overcharge protection circuit that determines based on the total voltage of the plurality of serially connected lithium ion battery cells whether these lithium ion battery cells are in the overcharge state, whether each battery cell is overcharged or not cannot be determined accurately if the voltage of each battery cell fluctuates. For instance, in a charging circuit that has three serially connected lithium ion batteries having a normal value of 4.2V in a fully-charged state, suppose that charging of each battery cell is stopped when the normal value of any of the battery cells becomes equal to or higher than 4.4V.

In this case, when the voltages of the three battery cells are equally 4.4V beyond the fully-charged state, the total voltage of the battery cells is 13.2V, which is determined as the overcharge state and no problem arises. However, if the voltages of the battery cells are different from one another when the batteries are deteriorated or the voltages fluctuate, the overcharge state of each battery cell cannot be detected accurately. In other words, when the voltages of the three battery cells are 4.2V, 4.3V and 4.5V, respectively, the total voltage is 13.0V. Although no abnormality is detected because this total voltage is equal to or lower than 13.2V, which is the criterion of the overcharge state, the battery of 4.5V voltage exceeds the normal value of the fully-charged state, which means that this battery is in the overcharge state.

In order to detect the overcharge state of each battery cell, it is necessary to monitor the voltage of each battery cell to determine whether it is in the overcharge state. For example, FIG. 4 shows a charging circuit which causes an excess voltage detector corresponding to each of a plurality of connected lithium ion battery cells to directly detect the voltage of the corresponding lithium ion battery cell, to determine whether the detected lithium ion battery cell is in the overcharge state.

Figure 4:
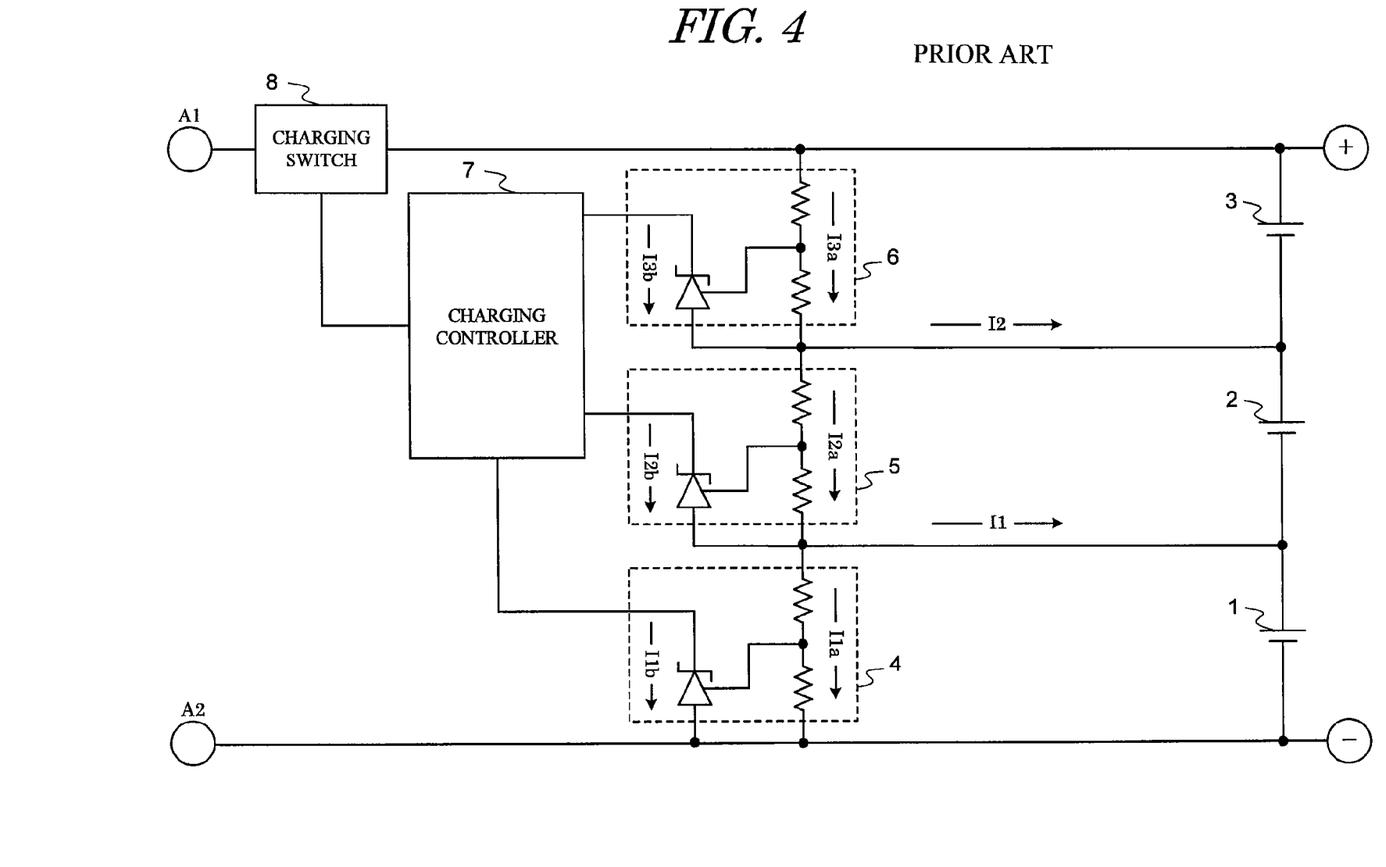
FIG. 4 is a block circuit diagram showing an example of a charging circuit of the conventional technology.

In the charging circuit shown in FIG. 4, excess voltage detectors 4 to 6 that detect, respectively, voltages of three serially connected battery cells 1 to 3 (the serial connection of the battery cells 1 to 3 is referred to as "battery") are connected in parallel with the battery cells 1 to 3. Moreover, there is provided a charging controller 7 that determines whether the battery cells 1 to 3 are in the overcharge states on the basis of the voltages detected by the excess voltage detectors 4 to 6, and then controls ON/OFF of a charging switch part 8.

In addition, the positive electrode of the battery is connected to an input terminal A1 via the charging switch part 8, and the negative electrode to an input terminal A2. A charger or the like is connected to the input terminals A1, A2, and thereby these input terminals A1, A2 are used for charging the battery cells 1 to 3 constituting the battery, that is, for supplying electric charges to the battery cells 1 to 3. As shown in FIG. 4, the excess voltage detectors 4 to 6 that are connected in parallel with the battery cells 1 to 3 and detect the voltages of the battery cells 1 to 3, respectively, have a structure in which two resistances are connected in series, and references of shunt regulators are connected to the connecting points of these resistances. These excess voltage detectors 4 to 6 determine whether the detected battery voltages exceed a previously set reference voltage.

An example of a process for determining the overcharge state in the charging circuit of FIG. 4 is described. First of all, when charging voltage to the battery, the charging switch part 8 is turned ON and electric charges are supplied to the battery cells 1 to 3 through the input terminals A1, A2. The excess voltage detectors 4 to 6 determine whether any of the detected voltages of the battery cells 1 to 3 exceeds the reference voltage indicating the overcharge state and, when it exceeds the reference voltage, transmits an excess voltage signal to the charging controller 7.

When the charging controller 7 receives the excess voltage signal from any of the excess voltage detectors 4 to 6, the charging controller 7 performs control to turn the charging switch part 8 OFF and then stops charging the voltage to the battery by terminating the supply of the electric charges to the battery cells 1 to 3. When the voltages of the battery cells 1 to 3 that are detected by the excess voltage detectors 4 to 6 do not exceed the reference voltage indicating the overcharge state the charging switch part 8 remains turned ON.

Not only the circuit of FIG. 4 that has the abovementioned configuration, but also a charging circuit described in Japanese Patent Application Publication No. 2007-14091 also has been developed as the conventional technology for monitoring a voltage of each battery cell and directly detecting the voltage of the battery cell by means of a voltage comparator to determine the overcharge state.

Incidentally, because the voltage of each battery is directly detected in the charging circuit of FIG. 4 or Japanese Patent Application Publication No. 2007-14091 that determines the overcharge state by monitoring each battery cell, when the voltages of the battery cells vary from one another as a result of deterioration or the like of any of the batteries, the consumed current might leak out of a circuit part to each battery cell, the circuit part determining whether each battery cell is in the overcharge state or not. As a result, the consumed current from the circuit part charges and discharges the battery cells, and consequently the circuit part itself damages the voltage balance of the batteries.

Suppose, for instance, there is the charging circuit in which the excess voltage detectors 4 to 6 for detecting the voltages of the three serially connected lithium ion battery cells 1 to 3 are directly connected in relation to the battery cells 1 to 3, as shown in FIG. 4. In this case, when the following [Expression 1] is satisfied based on a relationship among a current $I1a$ flowing in the excess voltage detector 4 corresponding to the battery cell 1, currents $I2a$ and $I2b$ flowing in the excess voltage detector 5 corresponding to the battery cell 2, and currents $I3a$ and $I3b$ flowing in the excess voltage detector 6 corresponding battery cell 3, charge/discharge currents $I1$ and $I2$ do not flow to each of the battery cells.

$$I2a+I2b=I1a$$

$$I3a+I3b=I2a \quad \text{[Expression 1]}$$

However, when the voltages of the battery cells 1 to 3 are not equal due to deterioration of any of the batteries or fluctuation of the voltages of the battery cells, or when the above-mentioned [Expression 1] is not satisfied by a current value sent from the charging controller 7, the charge/discharge currents $I1$ and $I2$ flow out to the battery cells 1 and 2 and charge and discharge the battery cells 1 and 2.

SUMMARY OF THE INVENTION

The present invention was contrived in order to solve the above problems, and an object thereof is to provide a charging circuit for a secondary battery, which monitors a midpoint between a plurality of serially connected battery cells constituting the secondary battery, and is capable of inhibiting a charge/discharge current from flowing to the midpoint and an input/output current from flowing from the midpoint to each battery cell, by connecting an operational amplifier to the midpoint. Another object of the present invention is to configure a voltage follower with the operational amplifier and an NPN transistor and use an output from the voltage follower to configure the ground of the circuit that detects and compares battery voltages, so that excess voltage of each battery cell can be detected with a high degree of accuracy without performing complicated computation.

In order to achieve the objects described above, the present invention is an overcharge protection circuit for a secondary battery, which protects a secondary battery constituted by a plurality of serially connected battery cells from being overcharged and which has excess voltage detection means for detecting, for each battery cell, a voltage of the battery cell and determining whether the voltage is equal to or higher than a reference voltage indicating an overcharge state, wherein the overcharge protection circuit further has charging control means for terminating charging of the plurality of battery cells when it is determined that the voltage of the battery cell detected by any of the excess voltage detection means is equal to or higher than the reference voltage, and a voltage follower constituted by an operational amplifier serving as a high input impedance element, and wherein a voltage of a midpoint between two adjacent battery cells is input to the voltage follower and an output voltage of the voltage follower is supplied to the excess voltage detection means.

In the overcharge protection circuit for a secondary battery, which has the basic characteristics described above, the voltage of the midpoint between the plurality of serially connected battery cells is detected by the operational amplifier and then subjected to impedance conversion so that the current flowing to the midpoint and the current flowing out of the midpoint can be inhibited, and the input/output current flowing from the midpoint between the battery cells to each battery cell can be inhibited. Accordingly, in the charging circuit in which a number of passive components are combined, deterioration of the circuit characteristics caused by absorbing the currents can be prevented. Here, "voltage follower" is defined as "having a high impedance and a gain of 1." This definition is based on the meaning of voltage follower that is generally understood in the field of electrical technology.

One aspect according to the present invention, in the overcharge protection circuit for a secondary battery that has the basic characteristics described above, is characterized in that the voltage follower has an NPN transistor, and an output terminal of the operational amplifier is connected to a base of the NPN transistor.

According to the aspect described above, although an output voltage of the operational amplifier to be output is approximately 70% of a power supply voltage, one NPN transistor is connected to the output terminal of the operational amplifier to configure the voltage follower, so that loss of the operational amplifier can be compensated. Therefore, even when the highest battery voltage or the battery cells include a short battery (0V battery), the voltage of the midpoint can be subjected to impedance conversion accurately and each battery cell voltage can be detected with a high degree of accuracy.

One aspect according to the present invention, in the overcharge protection circuit for a secondary battery that has the basic characteristics described above, is characterized in that the secondary battery is configured by a series connection of the plurality of battery cells and a plus terminal and minus terminal provided respectively on both sides of the series connection, and that a ground of the excess voltage detection means for detecting the voltage of each of the second and subsequent battery cells following the minus terminal is the output voltage of the voltage follower.

According to the aspect described above, when determining the overcharge state of the secondary battery, the ground of the excess voltage detection means for detecting whether the voltage of each battery cell is an excess voltage is configured by the output of the voltage follower constituted by the operational amplifier and NPN transistor. As a result, the excess voltage of each battery cell can be detected with a high degree of accuracy without performing complicated computation.

One aspect according to the present invention, in the overcharge protection circuit for a secondary battery in which the ground of the excess voltage detection means is the output voltage of the voltage follower, is characterized in that the overcharge protection circuit has a charging current detection resistance for detecting the charging current, one end of which is connected to a terminal supplied with a charging current from the outside, and the other end to the minus terminal, and that an emitter of the NPN transistor is connected to the one end of the charging current detection resistance.

The aspect described above can eliminate a saturation voltage that is generated between a collector and emitter of the NPN transistor when the connected battery cells include the short battery (0V battery). Specifically, the voltage of the input terminal of the current detection resistance to which power is supplied from the charger or the like is lower than the voltage of the minus terminal (to be referred to as "negative electrode" hereinafter) by i×(the resistance value of the current detection resistance), where i is the charging current flowing to the batteries. Therefore, by connecting the emitter terminal of the NPN transistor to the input terminal of the current detection resistance, the voltage of the collector of the NPN transistor can be controlled to the same level as the voltage of the negative electrode so that a difference generated by the saturation voltage can be eliminated.

One aspect according to the present invention, in the overcharge protection circuit for a secondary battery that has the basic characteristics described above, is characterized in that the overcharge protection circuit has a charging switch part which is turned ON/OFF to charge the secondary battery, and that when it is determined that the voltage of the battery cell detected by any of the excess voltage detection means is equal to or higher than the reference voltage, the charging control means performs control to turn the charging switch part OFF to terminate charging of the battery cells.

According to the aspect described above, when the excess voltage detection means determines that the actual battery cell voltage is an excess voltage, the charging control means performs control to turn the charging switch part ON, the charging switch part being configured by a PMOS transistor and the like, so that the charging current supplied to the second battery can be blocked easily.

One aspect according to the present invention, in the overcharge protection circuit for a second battery that has the basic characteristics described above, is characterized in that the overcharge protection circuit has a discharging switch part which is turned ON/OFF to discharge from the secondary battery, and over-discharge detection means for determining whether the voltage of the battery cell detected by any of the excess voltage detection means is equal to or lower than a reference voltage indicating an over-discharge state, and that when the over-discharge detection means determines that the voltage of any of the battery cells is equal to or lower than the reference voltage indicating the over-discharge state, the charging control means performs control to turn the discharging switch part OFF.

According to the aspect described above, overcharge protection is performed by detecting excess voltage of each battery cell, and the over-discharge state is detected based on the amount of voltage discharged when it is determined that the second battery is in the overcharge state. In this manner, the secondary battery can be protected from entering the over-discharge state.

Here, "discharge state" means that "the power is discharged from the secondary battery by turning the charging switch part OFF and simultaneously the discharging switch part ON by means of the charging control means." Therefore, when the actual voltage of the battery cell that is detected while the power is discharged from the secondary battery is reduced to the level equal to or lower than the reference voltage indicating the over-discharge state, the over-discharge detection means performs control to turn the discharging switch part OFF to stop the discharging.

According to the present invention, the voltage of the midpoint between the plurality of serially connected battery cells is detected by the operational amplifier and then subjected to impedance conversion so that the current flowing to the midpoint and the current flowing out of the midpoint can be inhibited, and the input/output current flowing from the midpoint between the battery cells to each battery cell can be inhibited. Accordingly, in the charging circuit in which a number of passive components are combined, deterioration of the circuit characteristics caused by absorbing the currents can be prevented.

Furthermore, when determining the overcharge state of the secondary battery, the ground of the excess voltage detection means for detecting whether the voltage of each battery cell is an excess voltage is configured by the output of the voltage follower constituted by the operational amplifier and NPN transistor. As a result, the excess voltage of each battery cell can be detected with a high degree of accuracy without performing complicated computation.

In addition, although an output voltage of the operational amplifier to be output is approximately 70% of a power supply voltage, one NPN transistor is connected to the output terminal of the operational amplifier to configure the voltage follower, so that loss of the operational amplifier can be compensated. Therefore, even when the highest battery voltage or the battery cells include a short battery (0V battery), the voltage of the midpoint can be subjected to impedance conversion accurately and each battery cell voltage can be detected with a high degree of accuracy.

When the connected battery cells include a short battery (0V battery), a saturation voltage, which is difficult to eliminate due to its characteristics, is generated between the collector and emitter of the NPN transistor. Specifically, even when the NPN transistor is in a completely ON state, if the short battery exists, the saturation voltage between the collector and the emitter increases the voltage of the collector of the NPN transistor higher than the voltage of the emitter by approximately several tens of mV.

However, the voltage of the input terminal of the current detection resistance is lower than the voltage of the negative electrode by i× (the resistance value of the current detection resistance), where i is the charging current flowing to the batteries. Therefore, by connecting the emitter of the NPN transistor to the input terminal side of the current detection resistance, the voltage of the collector of the transistor can be controlled to the same level as the voltage of the negative electrode so that a difference generated by the saturation voltage can be eliminated.

DESCRIPTION OF THE PREFERRED EMBODIMENTS

[1. Present Embodiment]
[1.1 Basic Configuration]

Next, the basic configuration of a charging circuit according to the present invention is described hereinafter with reference to FIG. 1. Because the configuration of the charging circuit according to the present invention is obtained by adding new components to the conventional charging circuit shown in FIG. 4, the same reference numerals as those of the conventional charging circuit shown in FIG. 4 are used to describe the same components and hence explanations thereof are omitted.

Figure 1:
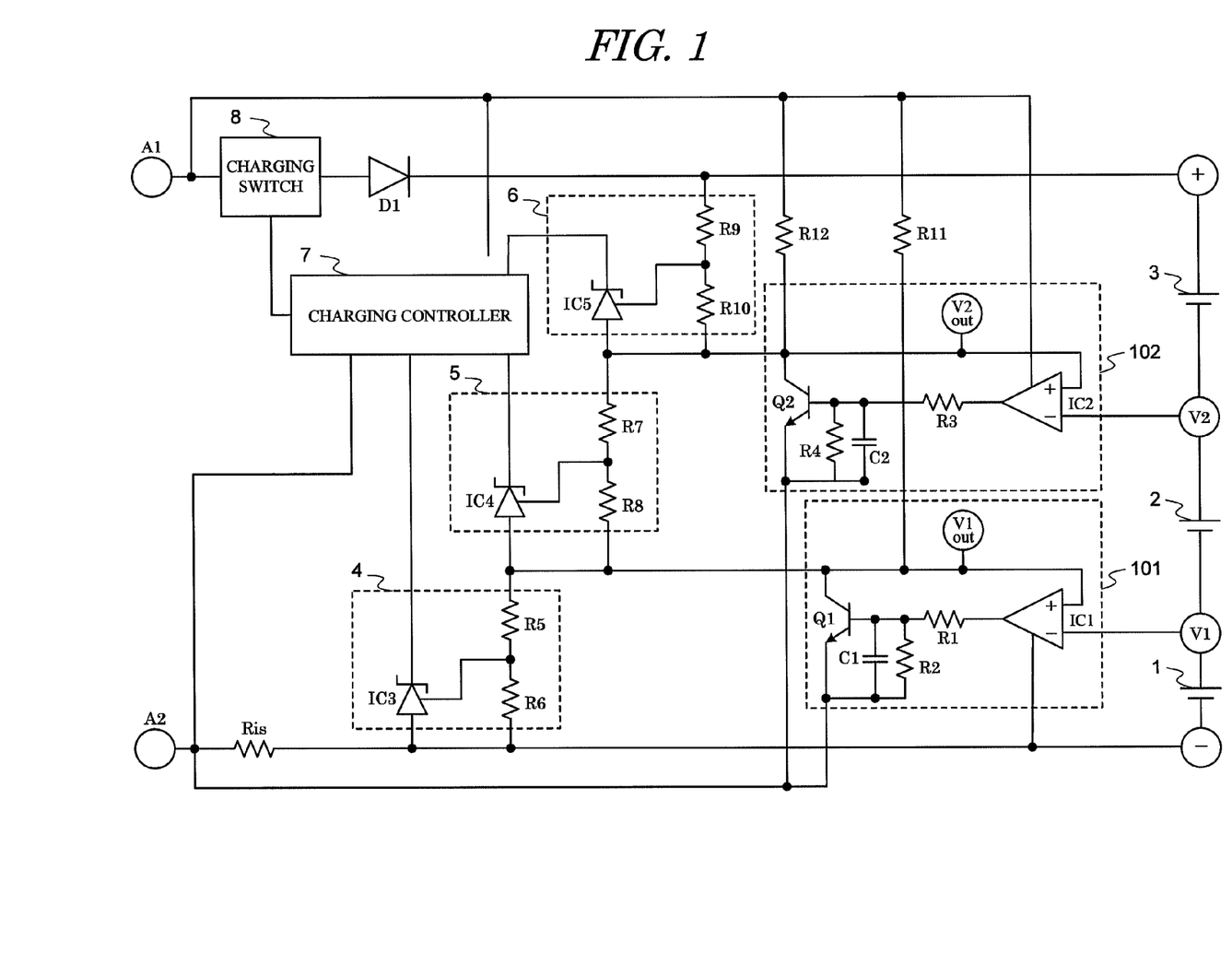
FIG. 1 is a block circuit diagram showing an example of a charging circuit according to an embodiment of the present invention.

As shown in FIG. 1, the charging circuit of the present embodiment, as with the conventional charging circuit shown in FIG. 4, is a circuit that has a battery in which three lithium ion battery cells 1 to 3 are serially connected. This charging circuit has disposed therein excess voltage detectors 4 to 6 for detecting whether the voltage of each of the battery cells 1 to 3 is an excess voltage, and a charging controller 7 for determining an overcharge state of each battery cell on the basis of the voltages detected by the excess voltage detectors 4 to 6 and then controlling ON/OFF of a charging switch part 8. In this embodiment, the excess voltage detectors 4 to 6 are not serially connected to the lithium ion battery cells 1 to 3, but voltage followers 101, 102 constituted by an operational amplifier, NPN transistor, and the like are connected to the midpoints between the serially connected battery cells 1 to 3, i.e., to the midpoint between the battery cell 1 and the battery cell 2 and the midpoint between the battery cell 2 and the battery cell 3, respectively. Then, the outputs of the voltage followers 101, 102 are configured as the grounds of the excess voltage detectors 5, 6, respectively.

Because the voltage followers 101, 102 are provided between the group of the battery cells 1 to 3 and the group of the excess voltage detectors 4 to 6, the voltages from the midpoints (the voltage of the midpoint between the battery cell 1 and the battery cell 2 is V1, the voltage of the midpoint between the battery cell 2 and the battery cell 3 is V2) are received by the operational amplifier serving as a high input impedance element so that the charge/discharge currents such as I1, I2 shown in FIG. 4 are inhibited from flowing to the midpoint between the battery cell 1 and the battery cell 2 and the midpoint between the battery cell 2 and the battery cell 3. In the present embodiment, "voltage follower" is defined as having the characteristics of "an input impedance is high and a gain is 1," as described above.

[1.2. Specific Configuration]

Next, the specific configuration of the charging circuit according to the present embodiment is described in detail with reference to FIG. 1. Note that the same reference numerals as those of the conventional charging circuit shown in FIG. 4 are used to describe the same components and hence explanations thereof are omitted.

As shown in FIG. 1, in the present embodiment, the voltage follower 101 is configured by an operational amplifier IC1, an NPN transistor Q1, and the like. The voltage follower 102 is configured by an operational amplifier IC2, an NPN transistor Q2, and the like.

The voltage V1 of the midpoint between the serially connected battery fells 1 and 2 is connected to an inverting input terminal (minus input terminal) of the operational amplifier IC1 configuring the voltage follower 101, and an output terminal of this operational amplifier IC1 is connected to the base of the NPN transistor Q1 via a resistance R1. An output $V1_{out}$ from a collector of the NPN transistor Q1 is connected to a non-inverting input terminal (plus input terminal) of the operational amplifier IC1.

A capacitor C1 with a relatively large capacity and a resistance R2 are connected to the NPN transistor Q1 to reduce the response speed of the NPN transistor Q1, whereby the output voltage $V1_{out}$ from the collector is set as V1.

Similarly, the voltage V2 of the midpoint between the serially connected battery cells 2 and 3 is connected to an inverting input terminal (minus input terminal) of an operational amplifier IC2 configuring the voltage follower 102, and an output terminal of this operational amplifier IC2 is connected to the base of the NPN transistor Q2 via a resistance R3. An output $V2_{out}$ from a collector of the NPN transistor Q2 is connected to a non-inverting input terminal (plus input terminal) of the operational amplifier IC2.

A capacitor C2 with a relatively large capacity and a resistance R4 are connected to the NPN transistor Q2 to reduce the response speed of the NPN transistor Q2, whereby the output voltage $V2_{out}$ from the collector is set as V2.

Resistances R11, R12 that are connected to an input terminal A1 are connected to the collectors of the NPN transistors Q1, Q2, respectively. The resistances R11, R12 pulls up the power supplied through the input terminal A1 to replenish absorbed currents of the NPN transistors Q1, Q2 so that the outputs $V1_{out}$, $V2_{out}$ from the collectors of the respective transistors Q1, Q2 are stabilized. Since the resistances R11, R12, to which electric charges flow from the input terminal A1, are connected to the collector terminals of the NPN transistors Q1, Q2 as described above, the voltage supplied from the input terminal A1 is input to the non-inverting input terminals (plus input terminal) of the operational amplifiers IC1, IC2.

The excess voltage detectors 4 to 6 that are configured by the resistances and shunt regulators and detect the voltages of the battery cells 1 to 3, as shown in FIG. 1, are constituted such that the ground of the excess voltage detector 4 is configured as a negative electrode of the battery, the ground of the excess voltage detector 5 as the output $V1_{out}$ of the voltage follower 101, and the ground of the excess voltage detector 6 as the output $V2_{out}$ of the voltage follower 102. Therefore, the excess voltage detectors 4 to 6 can detect the voltages of the battery cells 1 to 3 without using any arithmetic circuit.

Of these excess voltage detectors, the excess voltage detectors 4 is configured by two resistances R5, R6 and a shunt regulator IC3, wherein a reference of the shunt regulator IC3 is connected to the connecting point between the serially connected resistances R5, R6, the cathode of the shunt regulator IC3 to the charging controller 7, and the anode of the same to the ground of the excess voltage detector 4. Note that the terminal of the resistance R5 that is opposite from the resistance R6 is connected to the output $V1_{out}$ of the voltage follower 101.

Here, the shunt regulator IC3 divides the voltage $V1_{out}$, which is the voltage of the battery cell 1, by means of the resistances R5, R6. When the potential of the connecting point between the resistances R5 and R6 is equal to or higher than a previously reference voltage of the shunt regulator IC3, the cathode absorbs the current, whereby the shunt regulator IC3 transmits an excess voltage signal to the charging controller 7.

As with the excess voltage detector 4, the excess voltage detector 5 is configured by resistances R7, R8 and a shunt regulator IC4, wherein a reference of the shunt regulator IC4 is connected to the connecting point between the serially connected resistances R7, R8, the cathode of the shunt regulator IC4 to the charging controller 7, and the anode of the same to the ground of the excess voltage detector 5, that is, the output $V1_{out}$ of the voltage follower 101. Note that the terminal of the resistance R7 that is opposite from the resistance R8 is connected to the output $V2_{out}$ of the voltage follower 102.

Here, the shunt regulator IC4 divides the voltage, $V2_{out}-V1_{out}$, which is the voltage of the battery cell 2, by means of the resistances R7, R8. When the potential of the connecting point between the resistances R7 and R8 is equal to or higher than a previously reference voltage of the shunt regulator IC4, the cathode absorbs the current, whereby the shunt regulator IC4 transmits an excess voltage signal to the charging controller 7.

As with the excess voltage detectors 4 and 5, the excess voltage detector 6 is configured by resistances R9, R10 and a shunt regulator IC5, wherein a reference of the shunt regulator IC5 is connected to the connecting point between the serially connected resistances R9, R10, the cathode of the shunt regulator IC5 to the charging controller 7, and the anode of the same to the ground of the excess voltage detector 6, that is, the output $V2_{out}$, of the voltage follower 102. Note that the terminal of the resistance R9 that is opposite from the resistance R10 is connected to the positive electrode of the battery.

Here, the shunt regulator IC5 divides the voltage, positive electrode voltage—$V2_{out}$, which is the voltage of the battery cell 3, by means of the resistances R9, R10. When the potential of the connecting point between the resistances R9 and R10 is equal to or higher than a previously reference voltage of the shunt regulator IC5, the cathode absorbs the current, whereby the shunt regulator IC5 transmits an excess voltage signal to the charging controller 7.

Note that the positive electrode of the battery, which is the serial connection of the battery cells 1 to 3, is connected to the input terminal A1 via the charging switch part 8, and a back-flow prevention diode D1 is disposed between the charging switch part 8 and the positive electrode. Moreover, the negative electrode of the battery is connected to the input terminal A2 via a current detection resistance $R_{is}$. Note that the charging switch part 8 is configured by a diode and a PMOS transistor.

Here, the emitters of the NPN transistors Q1, Q2 are connected to the input terminal A2 side of the current detection resistance $R_{is}$ so as to eliminate a difference that is generated by a saturation voltage $V_{sat}$ between the collector and emitter of each of the NPN transistors Q1, Q2 when any of the battery cells 1 to 3 is a short battery (0V battery).

Specifically, the voltage of the collector of each of the NPN transistors Q1, Q2 is higher than the voltage of the emitter of the same by approximately several tens of mV even when the transistors Q1, Q2 are in a completely ON state, due to the saturation voltage $V_{sat}$ between the collector and emitter of each NPN transistors Q1, Q2. In other words, this difference between the voltages cannot be eliminated due to the characteristics of the battery, even if the operational amplifiers IC1, IC2 configuring the respective voltage followers 101, 102 try to control the outputs.

When a charging current i flows through the battery cells 1 to 3, the voltage on the input terminal A2 side of the current detection resistance $R_{is}$ is lower than the voltage of the negative electrode of the battery by $i \times R_{is}$. Therefore, by connecting the emitter terminals of the NPN transistors Q1, Q2 to the input terminal A2 side of the $R_{is}$ having a voltage lower than that of the negative electrode, the collectors of the transistors Q1, Q2 can be controlled to the same level as the voltage of the negative electrode. In order to do so, the following "Expression 2" needs to be satisfied.

$$V_{sat} \leq R_{is} \times i \quad \text{[Expression 2]}$$

[1.3. Operational Effects]

Next is described a procedure for overcharge determination protection of the charging circuit, which is performed based on the above-described configurations according to the present embodiment. Note that a charging state of the battery cells 1 to 3 means a state in which the charging controller 7 performs control to turn the charging switch part 8 ON and the power is supplied from a charger to the battery cells 1 to 3 via the input terminals A1, A2 by turning the charging switch part 8 ON.

In this state, the voltage V1 of the midpoint between the battery cell 1 and the battery cell 2 is input to the inverting input terminal (minus input terminal) of the operational amplifier IC1, and an electric charge that flows from the input terminal A1 is input from the charger to the non-inverting input terminal (plus input terminal) of the operational amplifier IC1 via the resistance R11. Moreover, the voltage V2 of the midpoint between the battery cell 2 and the battery cell 3 is input to the non-inverting input terminal (minus input terminal) of the operational amplifier IC2, and the electric charge flowing from the input terminal A1 is input from the charger to the non-inverting input terminal (plus input terminal) of the operational amplifier IC2 via the resistance R12.

Then, when the input from the non-inverting input terminal (plus input terminal) is greater than the input from the inverting input terminal (minus input terminal), the operational amplifiers IC1, IC2 output HI signals to perform control to turn the NPN transistors Q1, Q2 ON. When the input from the non-inverting input terminal (plus input terminal) is smaller, the operational amplifiers IC1, IC2 output LO signals to perform control to turn the NPN transistors Q1, Q2 OFF. In the charging state, the operational amplifiers IC1, IC2 normally output the HI signals, since the input from the non-inverting input terminal (plus input terminal) is greater than the input from the inverting input terminal (minus input terminal).

As a result of the output of the HI signals from the operational amplifier IC1, IC2, the NPN transistors Q1, Q2 are turned ON. Consequently, the excess voltage detectors 4 to 6 detect the voltages of the battery cells 1 to 3 and determine whether the detected voltages exceed previously set reference voltages of the shunt regulators IC3 to IC3 of the excess voltage detectors 4 to 6, the reference voltages indicating an excess voltage state. Then, when any of the three excess voltage detectors 4 to 6 corresponding to the battery cells 1 to 3 determines that the battery voltages exceed the reference voltages, the cathode of the shunt regulator of this excess voltage detector absorbs current. As a result, the excess voltage signal is transmitted to the charging controller 7.

On the other hand, when all of the three excess voltage detectors 4 to 6 corresponding to the battery cells 1 to 3 determine that the battery voltages do not exceed the reference voltages indicating the excess voltage state, the excess voltage signal is not transmitted to the charging controller 7, and each battery cell is continuously charged.

When receiving the excess voltage signal from any of the excess voltage detectors 4 to 6, the charging controller 7 determines that the secondary battery is in the overcharge state, and turns the ON charging switch part 8 OFF. Therefore, when any of the battery cells 1 to 3 is in the overcharge state, the supply of the electric charges supplied from the input terminals A1, A2 is terminated, and accordingly the charging of the secondary battery is stopped. When the charging is stopped by turning the charging switch part 8 OFF, a discharge current flows through the diode configuring the switch part 8.

According to the present embodiment described above, the voltages of the midpoints among the plurality of serially connected battery cells are detected by the operational amplifiers and then subjected impedance conversion, whereby the currents are prevented from flowing to and from the midpoints and input/output currents are prevented from flowing out of the midpoints between the battery cells to the battery cells. As a result, in the charging circuit in which a number of passive components are combined, deterioration of the circuit characteristics caused by absorbing the currents can be prevented.

Furthermore, when determining the overcharge state of the secondary battery, the ground of the excess voltage detection means for detecting whether the voltage of each battery cell is an excess voltage is configured by the output of the voltage follower constituted by the operational amplifier and NPN transistor. As a result, the excess voltage of each battery cell can be detected with a high degree of accuracy without performing complicated computation.

In addition, although an output voltage of the operational amplifier is approximately 70% of a power supply voltage at the most, one NPN transistor is connected to the output terminal of the operational amplifier to configure the voltage follower, so that loss of the operational amplifier can be compensated. Therefore, even when the highest battery voltage or the battery cells include a short battery (0V battery), the voltage of the midpoint can be subjected to impedance conversion accurately and each battery cell voltage can be detected with a high degree of accuracy.

When the connected battery cells include a short battery (0V battery), a saturation voltage $V_{sat}$, which is difficult to eliminate due to its characteristics, is generated between the collector and emitter of the NPN transistor. Specifically, even when the NPN transistor is in a completely ON state, if the short battery exists, the saturation voltage $V_{sat}$ between the collector and the emitter increases the voltage of the collector of the NPN transistor higher than the voltage of the emitter by approximately several tens of mV.

However, the voltage on the input terminal A2 side of the current detection resistance $R_{is}$ is lower than the voltage of the negative electrode by $i \times R_{is}$, where i is the charging current flowing to the batteries. Therefore, by connecting the emitter of the NPN transistor to the input terminal side of the current detection resistance $R_{is}$, the voltage of the collector of the transistor can be controlled to the same level as the voltage of the negative electrode so that a difference generated by the saturation voltage $V_{sat}$ can be eliminated.

[2. Other Embodiments]

In the above-described embodiment shown in FIG. 1, each voltage follower is configured by using the operational amplifier and NPN transistor in relation to the midpoint between the battery cells, but the configuration of each voltage follower is not limited to this configuration in the present embodiment. The present invention includes any other embodiment that uses a voltage follower formed by directly connecting the inverting input terminal (minus input terminal) of the operational amplifier to the output terminal.

Figure 2:
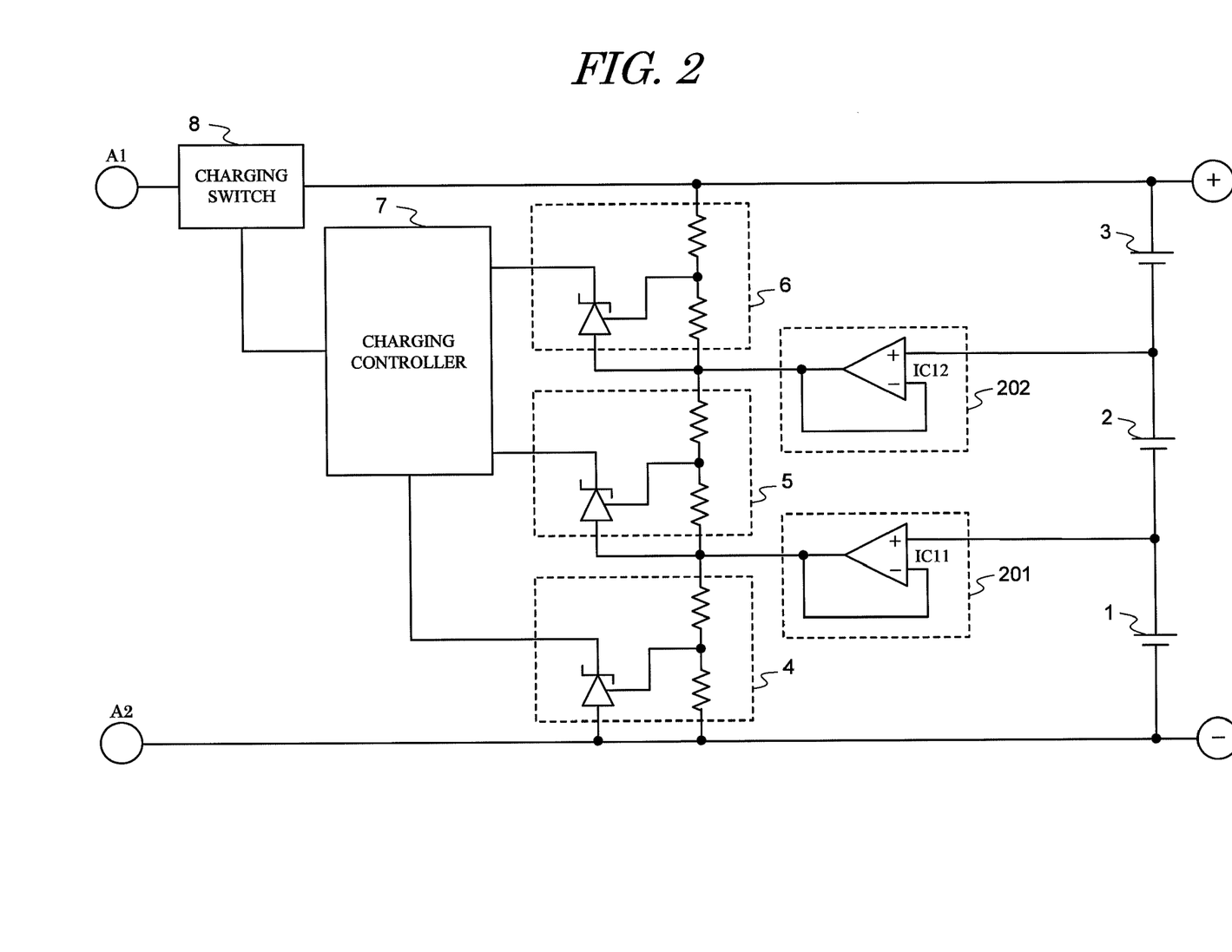
FIG. 2 is a block circuit diagram showing an example of a charging circuit according to another embodiment of the present invention.

Specifically, as shown in FIG. 2, the voltage followers 201, 202 are configured in relation to the midpoints between three lithium ion battery cells, as in the configuration shown in FIG. 1. However, the voltages V1, V2 of the respective midpoints are input to non-inverting input terminals (plus input terminals) of the operational amplifiers IC11, IC12, and these input voltages V1, V2 configure the grounds of the excess voltage detectors 5, 6. Specifically, since the NPN transistors shown in FIG. 1 are not used in the embodiment shown in FIG. 2, the operating ranges for the operational amplifiers IC11, IC12 are not taken into consideration. However, the present invention includes such an embodiment that uses the general voltage followers 201, 202 characterized in outputting the voltages V1, V2 of the midpoints directly to the excess voltage detectors 4 to 6.

Moreover, the present invention is not limited to the charging circuit of the above embodiment that performs overcharge protection by detecting the excess voltage of each battery cell. The present invention also includes such an embodiment that has a discharging circuit for detecting an over-discharge state of discharged voltage when it is determined that each battery cell is in the overcharge state. Specifically, in the embodiment shown in FIG. 3, not only the charging switch part 8 provided as a switching element in the embodiment shown in FIG. 1, but also a discharging switch part 9 for over-discharge protection is disposed in place of the backflow prevention diode D1. There is also provided an over-discharge detector 10 that detects an over-discharge state from a voltage detected by the excess voltage detectors of the charging controller 7.

Figure 3:
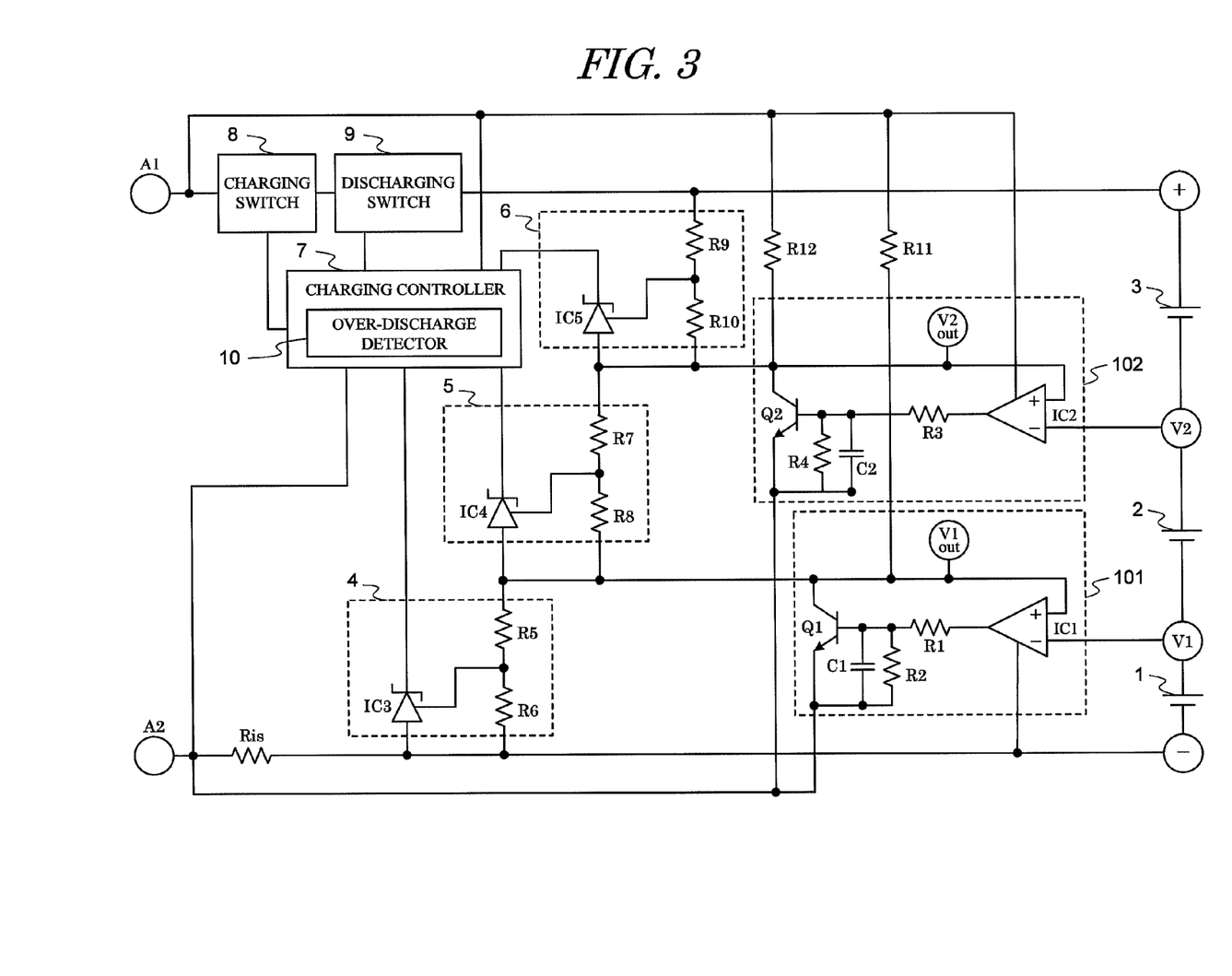
FIG. 3 is a block circuit diagram showing an example of a charging circuit capable of performing over-discharge protection according to yet another embodiment of the present invention.

In the embodiment shown in FIG. 3, the actual operation for discharging from the secondary battery is performed as follows. First, when the charging switch part 8 is turned OFF and at the same time the discharging switch part 9 is turned ON, a discharge current flows to the input terminal A1 side via the diode of the OFF charging switch part 8. Here, the over-discharge detector 10 of the charging controller 7 determines based on the voltage signals of the battery cells 1 to 3 detected by the excess voltage detectors 4 to 6 that which one of the battery cell voltages changes to the level equal to or lower than the reference voltage indicating the over-discharge state. When the over-discharge detector 10 determines that any of the battery cell voltages changes to the level equal to or lower than the reference voltage, the charging controller 7 determines that the secondary battery is in the over-discharge state and then performs control to turn the discharging switch part 9 OFF and at the same time turn the charging switch part 8 ON.

Moreover, the present invention uses the lithium ion battery as the secondary battery in the above embodiment, but the present invention further includes an embodiment that uses a nickel hydride battery or a nickel-cadmium battery.

Although the present invention determines that the secondary battery is in the overcharge state when the voltage of any of the plurality of battery cells 1 to 3 is the excess voltage due to charging, and then terminates the charging by turning the charging switch part 8 OFF, the present invention includes an embodiment that is provided with a liquid crystal display or other display part to transmit the information on that the secondary battery is in the overcharge state. Specifically, with such a configuration, not only is it possible to perform control to turn the charging switch part 8 OFF, but also it is possible to use the display part to transmit the fact that the charging switch part 8 is OFF, and also to use the display part to transmit the information on that the secondary battery is in the overcharge state, without turning the charging switch part 8 OFF. This display of message information using the display part can be performed similarly when the discharging switch part 9 is turned ON/OFF.

What is claimed is:

1. An overcharge protection circuit for a secondary battery that is configured by a series connection of a plurality of battery cells and a plus terminal and minus terminal provided respectively on both sides of the series connection, which protects a secondary battery from being overcharged, the overcharge protection circuit comprising:
    a plurality of voltage followers each constituted by an operational amplifier connected to each midpoint between two adjacent battery cells and serving as a high input impedance element and a NPN transistor connected to the operational amplifier, each of the said voltage followers outputting a voltage of the midpoint as an output voltage;
    a plurality of excess voltage detection portions each including a first resistance and a shunt regulator, detecting the output voltage from each voltage follower and determining whether the voltage is equal to or higher than a reference voltage indicating an overcharge state; and
    a charging control portion for terminating charging of the plurality of battery cells when it is determined that the output voltage of the voltage follower detected by the excess voltage detection portion is equal to or higher than the reference voltage,
    wherein a collector of the NPN transistor is directly connected to an input terminal of an outside power supply via a second resistance, and
    the voltage output from the operational amplifier is input to a base of the NPN transistor, stabilized by replenishing currents from the outside power supply via the second resistance, and supplied to a ground of the excess voltage detection portion that detects the voltage of each of the second and subsequent battery cells following the minus terminal.

2. The overcharge protection circuit for a secondary battery according to claim 1, further comprising:
a charging current detection resistance for detecting the charging current, configured such that one end of the resistance is connected to a terminal supplied with a charging current from the outside power supply, and the other end of the resistance is connected to the minus terminal.

3. The overcharge protection circuit for a secondary battery according to claim 2,
wherein the charging current detection resistance for detecting the charging current, is further configured such that one end of the resistance is connected to an emitter of the NPN transistor.

4. The overcharge protection circuit for a secondary battery according to claim 1, further comprising:
a charging switch part which is turned ON/OFF to charge the secondary battery, wherein when it is determined that the voltage of the battery cell detected by any of the excess voltage detection portions is equal to or higher than the reference voltage, the charging control portion performs control to turn the charging switch part OFF to terminate charging of the battery cells.

5. The overcharge protection circuit for a secondary battery according to claim 1, further comprising:
a discharging switch part which is turned ON/OFF to discharge from the secondary battery; and
an over-discharge detection means for determining whether the voltage of the battery cell detected by any of the excess voltage detection portion is equal to or lower than a reference voltage indicating an over-discharge state,
wherein when the over-discharge detection means determines that the voltage of any of the battery cells is equal to or lower than the reference voltage indicating the over-discharge state, the charging control portion performs control to turn the discharging switch part OFF.

* * * * *